A. C. DONELL.
BELT STRETCHER.
APPLICATION FILED FEB. 26, 1908.
914,815.
Patented Mar. 9, 1909.
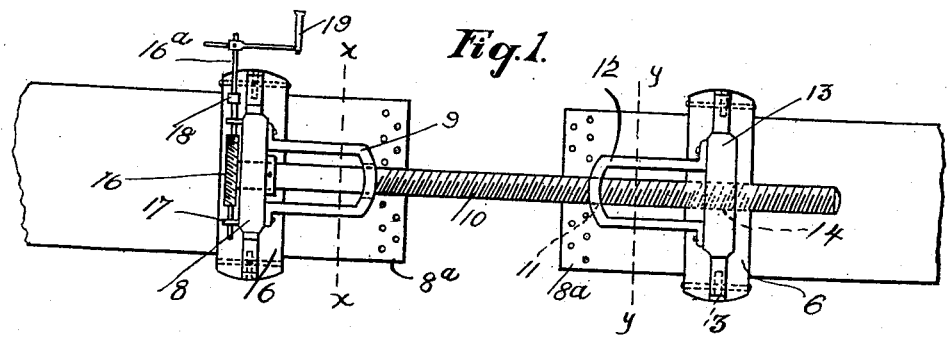
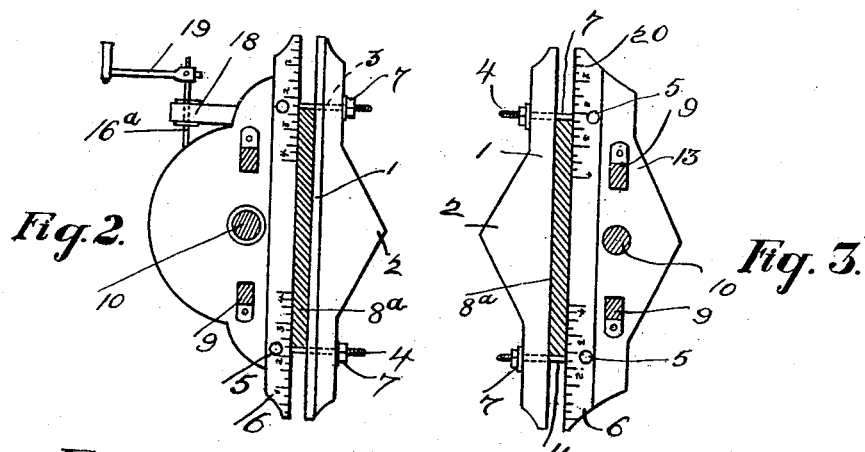
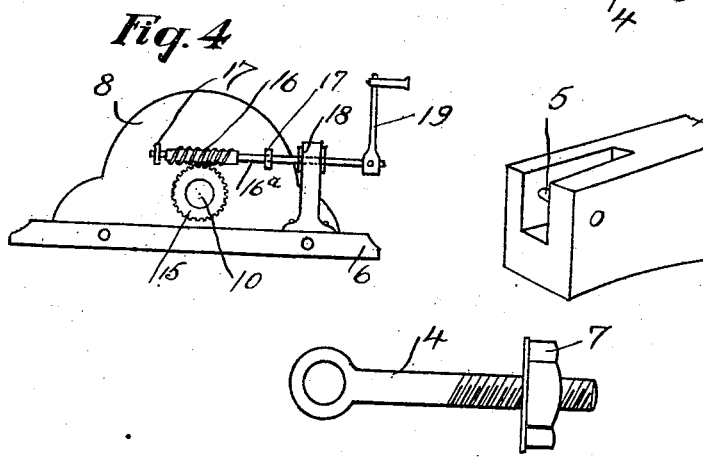
Witnesses
J. B. Lawrence
K. H. Butler
Inventor
A. C. Donell
By H. C. Evert
Attorneys

UNITED STATES PATENT OFFICE.

ADISEH C. DONELL, OF CANONSBURG, PENNSYLVANIA.

BELT-STRETCHER.

No. 914,815.  Specification of Letters Patent.  Patented March 9, 1909.

Application filed February 26, 1908. Serial No. 417,918.

*To all whom it may concern:*

Be it known that I, ADISEH C. DONELL, a citizen of the United States of America, residing at Canonsburg, in the county of Washington and State of Pennsylvania, have invented certain new and useful Improvements in Belt-Stretchers, of which the following is a specification, reference being had therein to the accompanying drawings.

This invention relates to a belt stretcher and the primary object of my invention is to provide simple and effective means for drawing the ends of a belt together, whereby the ends can be easily fastened.

Another object of my invention is to provide a novel clamp for holding the ends of a belt without injuring the same, the clamp being constructed whereby the ends of a belt can be positioned therein to correctly meet for lacing or riveting when the ends of the belt are brought together.

With the above and other objects in view which will more readily appear as the invention is better understood, the same consists in the novel construction, combination and arrangement of parts to be presently described and then specifically claimed.

In the drawings: Figure 1 is a plan of my belt stretcher, Fig. 2 is a cross sectional view taken on the line $x$—$x$ of Fig. 1, illustrating a head clamp, Fig. 3 is a similar view taken on the line $y$—$y$ of Fig. 1, illustrating a tail clamp, Fig. 4 is a side elevation of the head clamp, Fig. 5 is a perspective view of a portion of the clamp, and Fig. 6 is an elevation of a connecting bolt.

To put my invention into practice, I provide a head clamp and a tail clamp, these clamps being connected together by an adjustable screw, whereby after said clamps are placed in engagement with the ends of a belt, the ends of said belt can be drawn together by rotating the screw. The head and tail clamps comprise bottom plates 1 having central reinforcements 2. The outer ends of said plates are slotted, as at 3, to receive connecting bolts 4, pivotally mounted upon pins 5 arranged in the top plates 6 of the clamps. These connecting bolts are provided with nuts 7, whereby the top and bottom plates of each clamp can be secured upon the ends $8^a$ of a belt. The top plate 6 of the head clamp is provided with a lateral off-set portion constituting a bearing 8 and with a yoke 9. Revolubly mounted in the bearing 8 and the yoke 9 is a screw 10, which extends into the interiorly threaded opening 11 of a yoke 12, carried by a bearing 13 formed by a lateral off-set portion upon the tail clamp. This bearing is provided with an interiorly threaded opening 14, so that when the screw 10 is rotated, the clamps will be drawn toward each other, or moved away from one another. To rotate the screw 10, I provide said screw with a worm gear 15, adjacent to the bearing 8. Meshing with the worm gear 15 is a worm 16, carried by a shaft $16^a$, journaled in brackets 17 and 18, the former being carried by the bearing 8 and the latter by the top plate of the head clamp. One end of the shaft $16^a$ is provided with a suitable crank 19 for imparting a rotary movement to the worm 16 and the screw 10.

In order that the head and tail clamps can be accurately placed in engagement with the ends $8^a$ of the belt, I graduate the edges of the top plate 6, as at 20, and arrange the ends $8^a$ of the belt in said clamps, whereby the longitudinal edges of the belt will aline when the ends are drawn together.

It is thought that the manner of placing the clamps in engagement with the belts will be fully understood, also the operation of drawing the ends $8^a$ of the belt together, whereby they may be riveted or laced.

Having now described my invention what I claim as new, is:—

A belt stretcher comprising a head clamp and a tail clamp, each of said clamps comprising a slotted bottom board and a top board provided with a lateral off-set constituting a bearing, a plurality of connecting bolts between a top and a bottom board, said connecting bolts pivotally attached to the top board and engaging in the bottom board, clamping nuts carried by the free ends of said bolts whereby the top and bottom boards are connected together, a yoke extending at right angles with respect to and secured to each lateral off-set portion, said yokes extending toward each other, an adjusting screw revolubly mounted in the lateral off-set portion of the head clamp, extending through the yoke of the head clamp and adapted to engage in the yoke and bearing of the tail clamp, a worm gear carried on one end of said adjusting screw, bearing brackets carried by the off-set of the head clamp, an upright bearing bracket carried by the top board of the head clamp in proximity to one side of the off-set of the head clamp, a transversely extending worm shaft journaled in said bearing brackets meshing with the worm gear and adapted when rotated to adjust said screw, and a handle carried by the outer end of the worm shaft.

In testimony whereof I affix my signature in the presence of two witnesses.

ADISEH C. DONELL.

Witnesses:
B. RINOLD,
L. CASOL.